United States Patent
Ansari (10) Patent No.: US 9,450,569 B1
(45) Date of Patent: Sep. 20, 2016

(54) VERY LOW POWER REAL TIME CLOCK

(71) Applicant: Xilinx, Inc., San Jose, CA (US)

(72) Inventor: Ahmad R. Ansari, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/731,308

(22) Filed: Jun. 4, 2015

(51) Int. Cl.
G06F 1/04 (2006.01)
H03K 3/012 (2006.01)

(52) U.S. Cl.
CPC .................................. *H03K 3/012* (2013.01)

(58) Field of Classification Search
USPC .................. 327/99, 292, 298–299, 530, 535
See application file for complete search history.

(56) References Cited

U.S. PATENT DOCUMENTS 5,627,412 A * 5/1997 Beard ........................ G06F 1/32
307/58
6,486,454 B1 * 11/2002 Ryu ........................ H05B 6/666
219/719
8,484,489 B2 * 7/2013 Wu ............................ G06F 1/26
713/300

* cited by examiner

*Primary Examiner* — An Luu
(74) *Attorney, Agent, or Firm* — Keith Taboada; Robert M. Brush; Joshua Hamberger (57) ABSTRACT

A very low power real-time clock is provided. The real-time clock includes a real-time clock core and a real-time clock controller, both included in an electronic device. The core is powered both when the electronic device is powered on and when it is powered off. When the electronic device is powered off, the core operates on battery power. The controller is powered off when the electronic device is powered off, to save power. The core maintains a tick count and a seconds count. Because the core is powered on even when the electronic device is powered off, the core continues to update the tick count and seconds count even when the electronic device is powered off. The controller provides access, to external components, to the core. By not powering the controller when the electronic device is powered off, non-core functions do not draw power from a battery.

20 Claims, 6 Drawing Sheets

VERY LOW POWER REAL TIME CLOCK

TECHNICAL FIELD

Examples of the present disclosure generally relate to real time clocks for integrated circuits and, in particular, to a real time clock with very low power consumption.

BACKGROUND

Real-time clocks are components of electronic devices that maintain and update a value indicative of the "real" time and are included in a wide variety of devices. Typically, real-time clocks do not consume a very large amount of power. However, there is increasing emphasis on battery longevity and reduced power consumption for portable devices, and the power consumption of real-time clocks has a noticeable effect on battery life.

SUMMARY

A real-time clock system is provided herein. The real-time clock system includes a real-time clock core module operable in a first power supply domain, the real-time clock core module including a tick counter operable to advance a seconds counter based on an oscillator input. The real-time clock system also includes a real-time clock controller operable in a second power supply domain and operable to provide an interface for reading a seconds count from the seconds counter. The first power supply domain is powered by a battery when an electronic device that includes the real-time clock system is powered off and by a real-time clock core power supply when the electronic device is powered on. The second power supply domain is unpowered when the electronic device is powered off and is powered by a real-time clock controller power supply when the electronic device is powered on.

A method for maintaining a real-time clock value is also provided herein. The method includes operating a real-time clock core module in a first power domain, the real-time clock core module including a tick counter operable to advance a seconds counter based on an oscillator input. The method also includes operating a real-time clock controller in a second power supply domain, the real-time clock controller operable to provide an interface for reading a seconds count from the seconds counter. The first power supply domain is powered by a battery when an electronic device that includes the real-time clock system is powered off and by a real-time clock core power supply when the electronic device is powered on. The second power supply domain is unpowered when the electronic device is powered off and is powered by a real-time clock controller power supply when the electronic device is powered on.

An electronic device is also disclosed herein. The electronic device includes a real-time clock interface module. The electronic device also includes a real-time clock system. The real-time clock system includes a real-time clock core module operable in a first power supply domain, the real-time clock core module including a tick counter operable to advance a seconds counter based on an oscillator input. The real-time clock system also includes a real-time clock controller operable in a second power supply domain and operable to provide an interface for reading a seconds count from the seconds counter. The first power supply domain is powered by a battery when an electronic device that includes the real-time clock system is powered off and by a real-time clock core power supply when the electronic device is powered on. The second power supply domain is unpowered when the electronic device is powered off and is powered by a real-time clock controller power supply when the electronic device is powered on.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

A very low power real-time clock is provided. The real-time clock includes a real-time clock core and a real-time clock controller, both included in an electronic device. The core is powered both when the electronic device is powered on and when it is powered off. When the electronic device is powered off, the core operates on battery power. The controller is powered off when the electronic device is powered off, to save power.

The core maintains a tick count and a seconds count. Because the core is powered on even when the electronic device is powered off, the core continues to update the tick count and seconds count even when the electronic device is powered off. The controller provides access, to external components, to the core. For example, the controller allows reading and writing the seconds count and also allows operation of alarms. By not powering the controller when the electronic device is powered off, functions that are unnecessary (such as setting and reading the seconds count while the electronic device is powered off) do not draw power from a battery.

The core has a low-power architecture. More specifically, only three components of the core are flip-flop based registers. Other registers are latch-based registers, which result in low static and dynamic power draw. Further, only the tick count is clocked with the frequency of the clock oscillator frequency. A fraction counter and seconds counter, used for fractional tick calibration and to store the current time in seconds, respectively, are implemented with flip-flop based architectures, but are clocked very infrequently. The fraction counter is clocked a maximum of 16 cycles every 16 seconds. The seconds counter is clocked once per second. Advantageously, the tick counter and fraction counter may be ripple carry counters, further reducing the dynamic power draw of the RTC core.

Figure 1A:
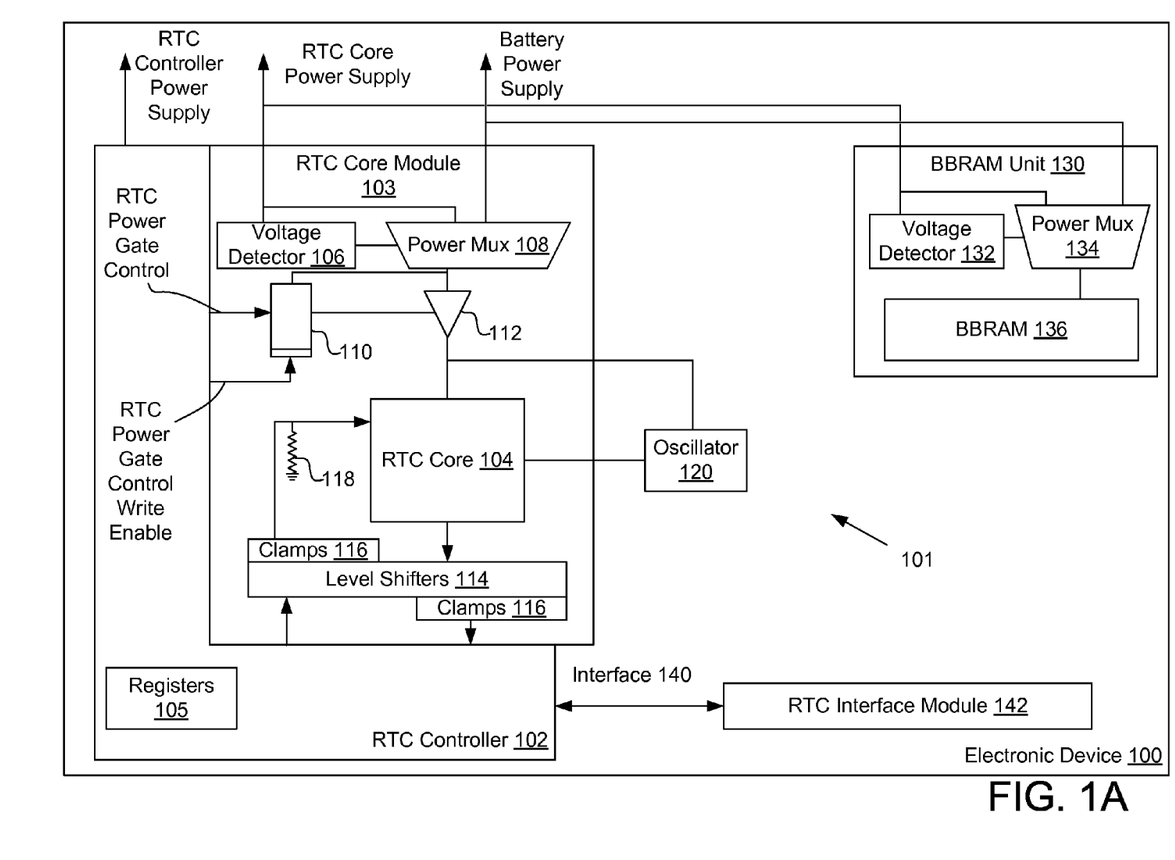
FIG. 1A is a block diagram of an electronic device that includes a real time clock system ("RTC system"), according to an example.

FIG. 1A is a block diagram of an electronic device 100 that includes a real time clock system ("RTC system") 101 and a battery-backed random access memory ("BBRAM") unit 130, according to an example. As shown, the real time clock system 101 includes a real time clock ("RTC") controller 102, an RTC core section 103, and an oscillator 120.

RTC controller 102 provides control functions for RTC core 104 and is accessed by a host or other components within or external to the electronic device 100 via interface 140. Interface 140 provides access between RTC system 101 and components in the electronic device 100 that access the RTC system 101. Interface 140 may be an Advanced Peripheral Bus interconnect developed by ARM Ltd. The components in electronic device 100 that access the RTC system 101 via interface 140 are collectively referred to as "RTC interface module 142" herein, and can include any combination of hardware or software in electronic device 100 that accesses RTC system 101. RTC interface module 142 may be controlled in part or in full by software or hardware external to the electronic device 100, such as software executing in a computer system that is external to, and in communication with, the electronic device 100.

RTC controller 102 provides functionality for setting the internal time stored in RTC core 104, setting alarm timings and generating alarm interrupts, setting calibration for RTC core 104, configuring the oscillator 120, and for obtaining the time and internal tick counter count from RTC core 104. RTC controller 102 includes registers 105 that store various values related to the control functions.

The RTC core section 103 includes an RTC core 104 that is clocked by oscillator 120 and that maintains a time-based count based on the oscillator 120. The oscillator 120 generates a signal having a fixed frequency. As is generally known, the oscillator 120 may include a crystal oscillator and other related components, or may generate a fixed frequency signal via other means.

The RTC core section 103 also includes an RTC voltage detector 106 and RTC power multiplexor 108 for selecting a power source for RTC core 104 and oscillator 120, as well as a power gate 112 and power gate control latch 110 for controlling whether RTC core 104 and oscillator 120 are provided with power.

The RTC system 101 includes various power-limiting features to reduce power consumption when electronic device 100 is powered off and RTC system 101 is operating on battery power. More specifically, when electronic device 100 is powered off, and RTC system 101 is operating under battery power, RTC controller 102 is not powered, thus reducing the power consumption of RTC system 101. RTC core 104 and oscillator 120 operate under battery power even when electronic device 100 (and RTC controller 102) is powered off. As described above, RTC core 104 stores and updates time-related internal values and thus continues to track time even when electronic device 100 is powered off.

RTC voltage detector 106 and RTC power multiplexor 108 operate to manage the power supply provided to RTC core 104 and oscillator 120 when electronic device 100 transitions between being powered on and off. More specifically, RTC voltage detector 106 detects whether the voltage of RTC core power supply is above or below a threshold voltage and provides a selection signal to RTC power multiplexor 108 that is dependent on the result of the detection. If the voltage of RTC core power supply is above the threshold, then the selection signal causes RTC power multiplexor 108 to select the RTC core power supply for provision to RTC core 104. If the voltage of RTC core power supply is below the threshold, then the selection signal causes RTC power multiplexor 108 to select the battery power supply instead. Thus, RTC core 104 receives power from RTC core power supply when available, and otherwise receives power from battery power supply.

The electronic device 100 may include components (such as BBRAM 136), other than RTC system 101, that are powered by a battery. Thus, in order to save battery power for those other components, a user may desire that RTC core 104 be unpowered. Thus, RTC core section 103 includes power gate 112 and power gate control latch 110. Power gate 112 either provides power from the RTC power multiplexor 108 or does not provide power to RTC core depending on the output from power gate control latch 110 which stores a one-bit power gate 112 enable value. When powered, RTC controller 102 is able to write a value into power gate control latch 110 to change whether power gate 112 provides power from RTC power multiplexor 108 or not. To write such a value, RTC controller 102 first asserts RTC power gate control write enable and then provides a value to power gate control latch 110, which then stores that value. Both power gate control latch 110 and power gate 112 are powered by the power supply that is output from RTC power multiplexor 108 (which may also be referred to herein as the "switched power supply"). Being powered in this manner allows the power gate control latch 110 to retain its value even when electronic device 100 is powered down, thus retaining the stored setting (i.e., whether RTC core 104 and oscillator 120 receive power from RTC power multiplexor 108) even when electronic device 100 is powered down. Note that the power gate 112 and power gate control latch 110 are optional and need not be included in RTC system 101. Without these elements, RTC core 104 and oscillator 120 would simply always be powered by the switched power supply.

When electronic device 100 is powered on, RTC core section 103 is powered by RTC core power supply and RTC controller 102 is powered by RTC controller power supply. Because these power supplies may have different voltages, level shifters 114 are provided to translate voltage levels (both ground and VDD) between the different supplies. Clamps 116 are also provided to clamp outputs of level shifters 114 in order to prevent the inputs from the level shifters 114 to the RTC core 104 or RTC controller 102 from floating or being non-deterministic when insufficient power is provide to the inputs. In order to save power, the level shifters 114 are powered by the RTC controller power supply and the RTC core power supply, and not the switched power supply. Therefore, when electronic device 100 is powered off, the level shifters 114 are also powered off. As a consequence, additionally, at each input to RTC core 104, a pull-down resistor 118 is provided to clamp that input to ground and prevent the input from floating when the RTC core power supply is off and the battery power is available. The pull-down resistor 118 has a sufficiently high resistance to clamp the inputs to ground when RTC core 104 is operating on battery power supply but to allow communication of signals between RTC core 104 and RTC controller 102 when RTC core 104 is operating on RTC core power supply and RTC controller 102 is powered as well. Note that, in addition to preventing the inputs from floating, one additional reason that inputs are clamped to ground is to switch all write enable signals off, thus preventing values stored in RTC core 104 from being inadvertently changed while RTC controller 102 is not powered.

The BBRAM unit 130 is a random access memory ("RAM") module that stores data that may be related to operation of the electronic device 100, and that is "backed"—or powered—by the battery. One example use for the BBRAM unit 130 is to store security keys when the electronic device 100 is powered off. The BBRAM unit 130 includes a BBRAM voltage detector 132 and a BBRAM power multiplexor 134 for selecting a power supply to power BBRAM 136. In a similar manner as with RTC voltage detector 106 and RTC power multiplexor 108, BBRAM voltage detector 132 and BBRAM power multiplexor 134 select between batter power supply and RTC core power supply for powering BBRAM 136. Thus, BBRAM 136 can be said to be powered by its own "switched power supply."

Figure 1B:
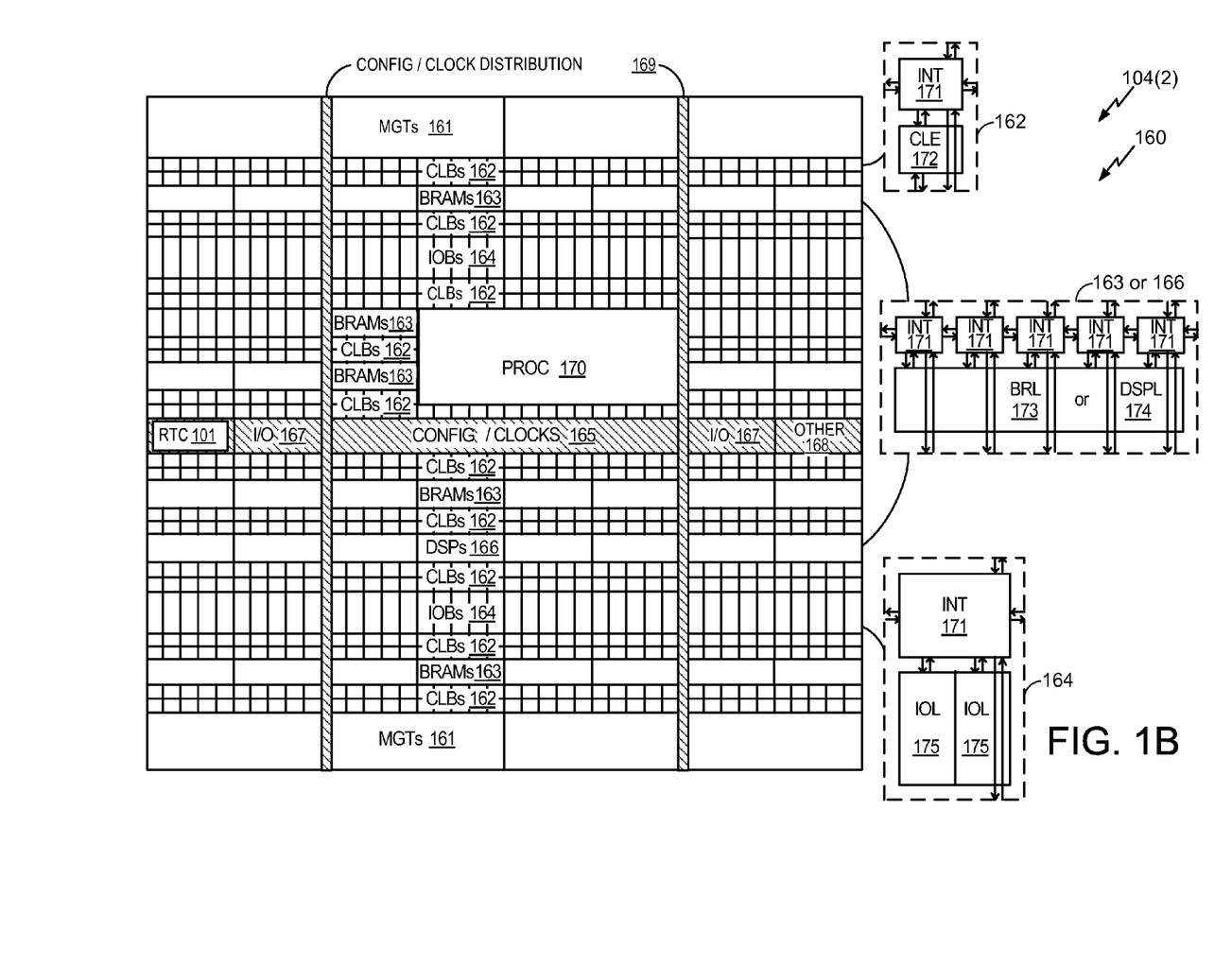
FIG. 1B illustrates an integrated circuit that is an example of electronic device 100.

FIG. 1B illustrates an integrated circuit 160 that is an example of electronic device 100, according to an example. Integrated circuit ("IC") 160 includes a large number of different programmable tiles including multi-gigabit transceivers ("MGTs") 161, configurable logic blocks ("CLBs") 162, random access memory blocks ("BRAMs") 163, input/output blocks ("IOBs") 164, configuration and clocking logic ("CONFIG/CLOCKS") 165, digital signal processing blocks ("DSPs") 166, specialized input/output blocks ("I/O") 167 (e.g., configuration ports and clock ports), and other programmable logic 168 such as digital clock managers, analog-to-digital converters, system monitoring logic, and so forth. Integrated circuit 160 also includes RTC system 101 for maintaining real time when integrated circuit 160 is powered off. The IC 160 may be a field programmable gate array ("FPGA") architecture. IC 160 also includes a dedicated processor, also referred to as a "processing system" or "PROC" 170.

Optionally, each programmable tile includes a programmable interconnect element ("INT") 171 having standardized connections to and from a corresponding interconnect element in each adjacent tile. The programmable interconnect elements taken together implement the programmable interconnect structure for the illustrated IC 160. The programmable interconnect element 171 also includes the connections to and from the programmable logic element within the same tile, as shown by the examples included at the top of FIG. 1B.

For example, a CLB 162 can include a configurable logic element ("CLE") 172 that can be programmed to implement user logic plus a single programmable interconnect element ("INT") 171. A BRAM 163 can include a BRAM logic element ("BRL") 173 in addition to one or more programmable interconnect elements 171. Typically, the number of interconnect elements 171 included in a tile depends on the height of the tile. In the pictured IC 160, a BRAM tile 163 has the same height as five CLBs 162, but other numbers (e.g., four) can also be used. A DSP tile 166 can include a DSP logic element ("DSPL") 174 in addition to an appropriate number of programmable interconnect elements 171. An IOB 164 can include, for example, two instances of an input/output logic element ("IOL") 175 in addition to one instance of the programmable interconnect element 171. As will be clear to those of skill in the art, the actual I/O pads connected, for example, to the I/O logic element 175 typically are not confined to the area of the input/output logic element 175.

In the pictured IC 160, a horizontal area near the center of the die is used for configuration, clock, RTC system 101, I/O 167, and other control logic. Vertical columns 169 extending from this horizontal area or column are used to distribute the clocks and configuration signals across the breadth of the IC 160.

Optionally, IC 160 includes additional logic blocks that disrupt the regular columnar structure making up a large part of the IC. The additional logic blocks can be programmable blocks and/or dedicated logic. For example, processor block 170 spans several columns of CLBs and BRAMs.

PROC 170 can be implemented as a hard-wired processor that is fabricated as part of the die that implements the programmable circuitry of the IC 160 and does not include the programmable tiles included within the PL domain. PROC 170 can represent any of a variety of different processor types and/or systems ranging in complexity from an individual processor, e.g., a single core capable of executing program code, to an entire processor system having one or more cores, modules, co-processors, interfaces, or the like.

In a more complex arrangement, for example, PROC 170 can include one or more cores, e.g., central processing units, cache memories, a memory controller, unidirectional and/or bidirectional interfaces configurable to couple directly to I/O pins, e.g., I/O pads, of the IC 160 and/or couple to the programmable circuitry of the IC 160. The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC 160. For example, portions shown in FIG. 1B that are external to PROC 170 can be considered part of the, or the, programmable circuitry of the IC 160.

Note that FIG. 1B is intended to illustrate only an exemplary IC 160 architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC 160 more than one adjacent row of CLBs 162 is typically included wherever the CLBs 162 appear, to facilitate the efficient implementation of user logic, but the number of adjacent CLB 162 rows varies with the overall size of the IC 160.

Figure 2:
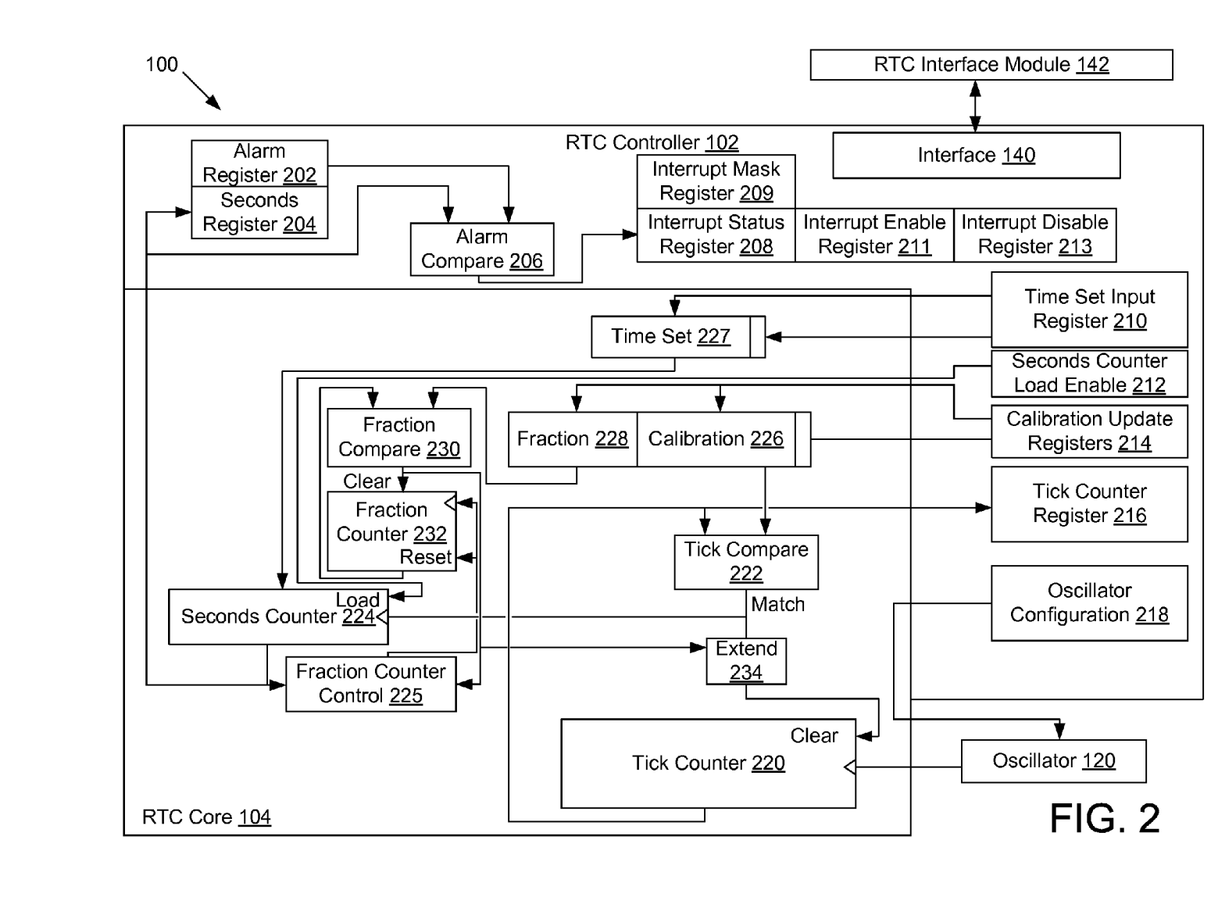
FIG. 2 is a block diagram illustrating details of the RTC controller and RTC core of FIG. 1A, according to an example.

FIG. 2 is a block diagram illustrating details of the RTC controller 102 and RTC core 104, according to an example. More specifically, FIG. 2 illustrates registers 105 within RTC controller 102 and counting and calibration elements within RTC core 104. For clarity, certain details shown in FIG. 1 are left out of FIG. 2. For example, the power supplies and related components are not shown. All elements shown within RTC core 104, as well as oscillator 120, are powered by the output of RTC power multiplexor 108, as gated by RTC power gate 112. All elements shown within RTC controller 102 are powered by RTC controller power supply when electronic device 100 is powered on and are not powered when electronic device 100 is powered off. The level shifters 114 and clamps 116 are not shown in FIG. 2, but function as described above with respect to FIG. 1.

Within RTC core 104, tick counter 220 is clocked by oscillator 120. Tick counter 220 counts from zero (or some minimum value) to a maximum value. For low power consumption, tick counter 220 may be a ripple carry counter, an example of which is provided in FIG. 3. The output of tick counter 220 (a "tick value") is provided to tick comparator 222, which compares that value to a calibration value stored in calibration value register 226. The calibration value is determined via a calibration procedure and subsequently stored into calibration value register 226. An example calibration procedure is described below.

The output of tick comparator 222 is zero when tick comparator 222 detects that the calibration value is not equal to the tick value and is one when tick comparator 222 detects that the calibration value is equal to the tick value 220. The calibration value is selected so that it would take 1 second for the tick counter to start from 0 until the tick comparator detects a match. Thus, tick comparator 222 clocks seconds counter 224 once every time the tick value reaches the calibration value. Additionally, when tick comparator 222 detects that the calibration value is equal to the tick value 220, tick comparator 222 clears the tick value stored in the tick counter 220, thus resetting the tick counter 220 for a new count. This clear may be extended by fractional calibration operations as described in further detail below. Because seconds counter 224 is clocked once every second, seconds counter 224 counts seconds and thus acts as a timer. The seconds counter 224 stores a count of the total number of seconds that have elapsed since an original date and time. In one example, the original date and time is 12:00:00 AM on Jan. 1, 1970, in accordance with Unix time.

The clear signal that resets the tick counter 220 may be extended by extend block 234, which operates in conjunction with fractional calibration register 228 to provide fractional-tick adjustment. More specifically, every time the fraction counter 232 asserts its extend clear signal to the tick counter 220, the tick counter 220 remains in the clear state.

Inaccuracies in the oscillator 120 can be compensated for by adjusting the calibration value stored in calibration value register 226 so that the remaining inaccuracy would be a fraction of a tick each second. The remaining inaccuracy can be compensated using the fraction counter 232 (and fractional calibration register 228). Every 16 seconds, the accumulated fractional inaccuracy can be approximated to a total number of ticks between 0 and 16. This value is programmed into the fraction calibration register 228, and after every 16 seconds, fraction counter control 225 causes the fraction counter 232 to start incrementing from 0 to the value that is programmed into the fractional calibration register 228. During the time the fraction counter 232 is incrementing, the clear signal to the tick counter 220 remains asserted and thus incrementing the tick counter 220 is delayed for the number of ticks programmed into the fractional calibration register 228 every 16 seconds. Note that the number 16 is just one example of the number of seconds over which fractional timing is performed, and this number can be any other technically feasible number. This number (16 or any other number chosen) may be referred to herein as the "periodic fraction check value." When fraction comparator 230 determines that the fraction counter value is equal to the maximum fraction counter tick value, fraction counter control 225 resets fraction counter 232 and fraction comparator 230 releases the clear signal to the tick counter 220, which allows the tick counter 220 to start incrementing the stored tick value again. Note that fractional calibration register 228 also includes an enable bit. When this bit is a "1," fraction comparator 230 performs the operations associated with fractional calibration (including extending clearing of the tick counter 220) and when this bit is a "0," fractional calibration is disabled and thus fraction comparator 230 does not perform these operations.

RTC controller 102 includes various elements that function to store values related to the counts being maintained by RTC core 104, to configure RTC core 104, an alarm, and oscillator configuration input 218. When electronic device 100 is powered off, these elements are also powered off and do not consume power.

RTC controller 102 includes registers 105 (FIG. 1), which includes alarm register 202, seconds register 204, interrupt status register 208, interrupt mask register 209, interrupt enable register 211, interrupt disable register 213, time set input register 210, calibration update registers 214, and tick counter register 216. RTC controller 102 also includes an alarm comparator 206, and receives various inputs, including a seconds counter load enable input 212 and an oscillator configuration input 218, as well as other inputs that are not shown, via interface 140.

The registers 105 are activated when powered on and perform the following functions. Seconds register 204 is a read-only register that reflects the value of the seconds count from seconds counter 224. Alarm register 202 stores an alarm value that is set by external software or hardware (e.g., RTC interface module 142) via interface 140. The alarm value indicates a specific seconds count that, when arrived at by seconds register 204, causes RTC controller 102 to generate an interrupt to be sent out via interface 140. Alarm comparator 206 compares the value in alarm register to the value in seconds register and, if they match, transmits an alarm signal to interrupt status register 208. Interrupt status register 208 stores state for the interrupt, and if the interrupt is not masked in the interrupt mask register 209, the interrupt is enabled in the interrupt enable register 211, and the interrupt is not disabled in the interrupt disable register 213, then RTC controller 102 generates an interrupt for transmission via interface 140. Time set input register 210 stores a value for writing to seconds counter 224. Time set input register 210 includes both the value to be stored and a bit for write enable of time set register 227. Seconds counter load enable input 212 allows the value from time set register 227 to be written to seconds counter 224 when a logical high. Calibration update registers 214 store values to be written to fractional calibration register 228 and calibration value register 226 and also store a bit for write enable to those calibration registers. Tick counter register 216 receives and stores the tick count value from tick counter 220. Oscillator configuration input 218 stores configuration data for oscillator 120.

Note that when electronic device 100 is powered off, RTC controller 102 is not powered. Thus, RTC controller 102 does not draw power from a connected battery. The power that would be drawn by, for example, the various registers of RTC controller 102, is not drawn from the battery. By separating the RTC controller 102 from the RTC core 104 and by powering off the RTC controller 102 when the electronic device 100 is powered off, the power consumed by RTC system 101 is reduced as compared with traditional real time clock systems. Power draw is further reduced because dynamic power draw of RTC core 104 is low. Dynamic power draw is the power draw experienced by circuit elements that run on a periodic clock. Among other things, the number of circuit elements that are clocked, as well as the frequency with which those circuit elements are clocked, determines dynamic power draw. Thus, reducing the number of circuit elements that are clocked reduces dynamic power draw. In the RTC core 104, only the seconds counter 224, fraction counter 232, and tick counter 220 are clocked. The time set register 227 and calibration registers 226, 228, are implemented as latches (which are not clocked) and thus have very minimal dynamic power draw. Additionally, the seconds counter 224 is clocked once per second and the fraction counter 232 is clocked between 0-16 cycles every 16 seconds, which is much less frequently than the frequency of the oscillator 120, which reduces the dynamic power draw. Further, the tick counter 220 may be implemented in a manner that reduces power draw. One such implementation is a ripple carry counter, which is described below with respect to FIG. 3. To reduce static power draw, the transistors of the various components of RTC core 104 (such as transistors in tick counter 220, tick comparator 222, fraction comparator 230, fraction counter 232, and the other components in RTC core 104) may be implemented as thick-oxide transistors, to reduce leakage current.

When electronic device 100 is powered on, RTC controller 102 is powered and RTC interface module 142 is able to interface with RTC controller 102 to perform various functions related to the RTC system 101. Several of these functions are now described.

In some situations, RTC interface module 142 performs alarm-related operations. More specifically, RTC interface module 142 programs alarm register 202 with a seconds value that represents the time at which an alarm is to occur. Alarm comparator 206 compares the value stored in seconds counter 224 to the value stored in alarm register 202 and, if the values are equivalent, enables an alarm interrupt flag in interrupt status register 208. When the interrupt flag is enabled, interface 140 transmits an interrupt to RTC interface module 142, which may act on that interrupt as programmed. After processing the interrupt, the external processor (RTC interface module 142) can clear the interrupt flag by writing to the interrupt status register 208 clears the interrupt flag. An external processor (RTC interface module 142) can disable the interrupt by writing to interrupt disable register 213 and can enable the interrupt by writing to interrupt enable register 211.

RTC interface module 142 may update the time stored by RTC core 104 via time set input register 210 and seconds counter load enable 212. More specifically, RTC interface module 142 loads the desired value into time set input register 210, including a bit to enable writing to time set register 227, which causes time set register 227 to store that value. Subsequently, RTC interface module 142 asserts seconds counter load enable 212, which causes the value stored in time set register 227 to be written to seconds counter 224, thus setting the time stored in RTC core 104. Whenever a new time is written into the seconds register 204, that value is also loaded in the time set register 210 in the RTC core 104, with the write enable signal being generated by the RTC controller 102. Seconds counter load enable 212 generates an enable signal for writing to seconds counter 224 via a state machine in the RTC controller 102 so that the value is loaded in the seconds register 204 when the seconds counter 224 is not changing.

RTC interface module 142 is also able to calibrate RTC core 104 via calibration update registers 214. More specifically, RTC interface module 142 loads the calibration value and fractional calibration value into calibration update register 214 and asserts a write enable signal for calibration value register 226 and fractional calibration register 228. Asserting this write enable signal causes the value from calibration update registers 214 to be written to calibration value register 226 and fractional calibration register 228, thus calibration RTC core 104.

RTC interface module 142 may perform calibration operations to determine values to write into calibration value register 226 and fractional calibration register 228. To perform the calibration operations, RTC interface module 142 programs the seconds counter 224 with a particular value S and records the time (S) at which that value is programmed. Note that the time S represents both the time at which the seconds counter 224 is programmed as well as the value that is programmed into seconds counter 224 at time S. Subsequently, at time T, RTC interface module 142 reads the value (R) from seconds counter 224. Note that RTC interface module 142 is able to read the value stored in the seconds counter 224 via seconds register 204. RTC interface module 142 uses the following expressions to determine the new values to write into calibration value register 226 and fractional calibration register 228:

$$X_f = \frac{(R-S)\times\left((C+1)+\left(\frac{(F+1)}{16}\right)\right)}{(T-S)};$$

$C_{new} = \text{Int}(X_f) - 1$; and $F_{new} = \text{Round}((X_f - C_{new}) \times 16) - 1$ $X_f$: actual oscillator 120 frequency
C: value originally stored in calibration value register 226
F: value originally stored in fractional calibration register 228
S: time at which the RTC core 104 is programmed
T: time at which value stored in seconds counter 224 is read
R: value read from seconds counter 224 at time T
$C_{new}$: new value for calibration value register 226
$F_{new}$: new value for fractional calibration register 228
Int(x): the immediately previous integer value of x (i.e., floor function)
Round(x): x rounded to the nearest integer These expressions determine the actual frequency of the oscillator 120 and determine values for the calibration value register 226 and fractional calibration register 228 based on the actual frequency of the oscillator 120. More specifically, RTC interface module 142 calculates the frequency of oscillator 120 as the actual total number of ticks (i.e., tick counter 220 ticks) since programming the seconds counter 224 (the top of the fraction in the expression for $X_f$) divided by the difference in time (in ticks) between the time the value in seconds counter 224 is read and the time at which the seconds counter 224 is programmed. The total number of ticks is calculated as the number of ticks per second, according to the original calibration register values (i.e., C and F) multiplied by the number of seconds between when the seconds counter 224 is read and programming the seconds counter 224. $C_{new}$ is simply determined as the integer value of $X_f$ and $F_{new}$ is determined by multiplying the fractional value of $X_f$ (i.e., $X_f - C_{new}$) by 16 and subtracting 1. Note that the value 16 may be different if the maximum fractional counter tick value is different than 16.

Once the values $C_{new}$ and $F_{new}$ are determined, RTC interface module 142 programs these values into calibration value register 226 and fractional calibration register 228.

RTC interface module 142 is able to read the value stored in tick counter 220 via tick counter register 216, which stores the tick value from tick counter 220. RTC interface module 142 is also able to configure oscillator 120 via oscillator configuration input 218. For example, the oscillator 120 may be enabled or disabled via oscillator configuration input 218. The oscillator 120 may also be put into test mode via oscillator configuration input 218, which causes a single tick to be output instead of the crystal oscillator.

Figure 3:
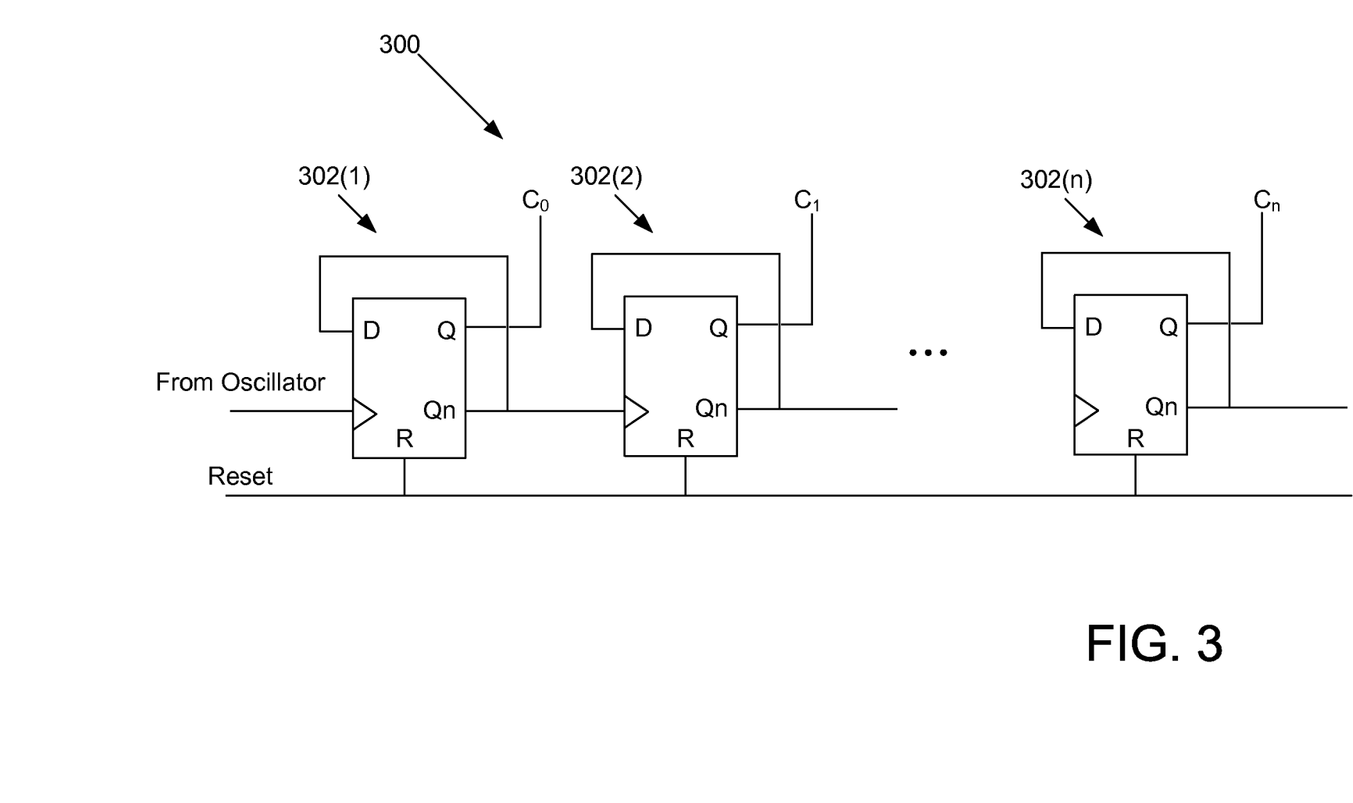
FIG. 3 is an illustration of a ripple carry counter, according to an example.

FIG. 3 is an illustration of a ripple carry counter 300, according to an example. The ripple carry counter 300 includes a sequence of flip flops 302. A first flip flop 302(1) is clocked by the oscillator 120. The positive output Q provides a least significant bit of the tick count value. A second flip flop 302(2) is clocked by the negative output Qn of flip flop 302(1) and the positive output Q of flip flop 302(2) provides a next-most-significant bit of the tick count value. This pattern continues to the flip flop 302(n) that stores the most-significant bit. Because each flip flop is clocked only when it changes value, the dynamic power of ripple carry counter 300 is relatively low.

Figure 4:
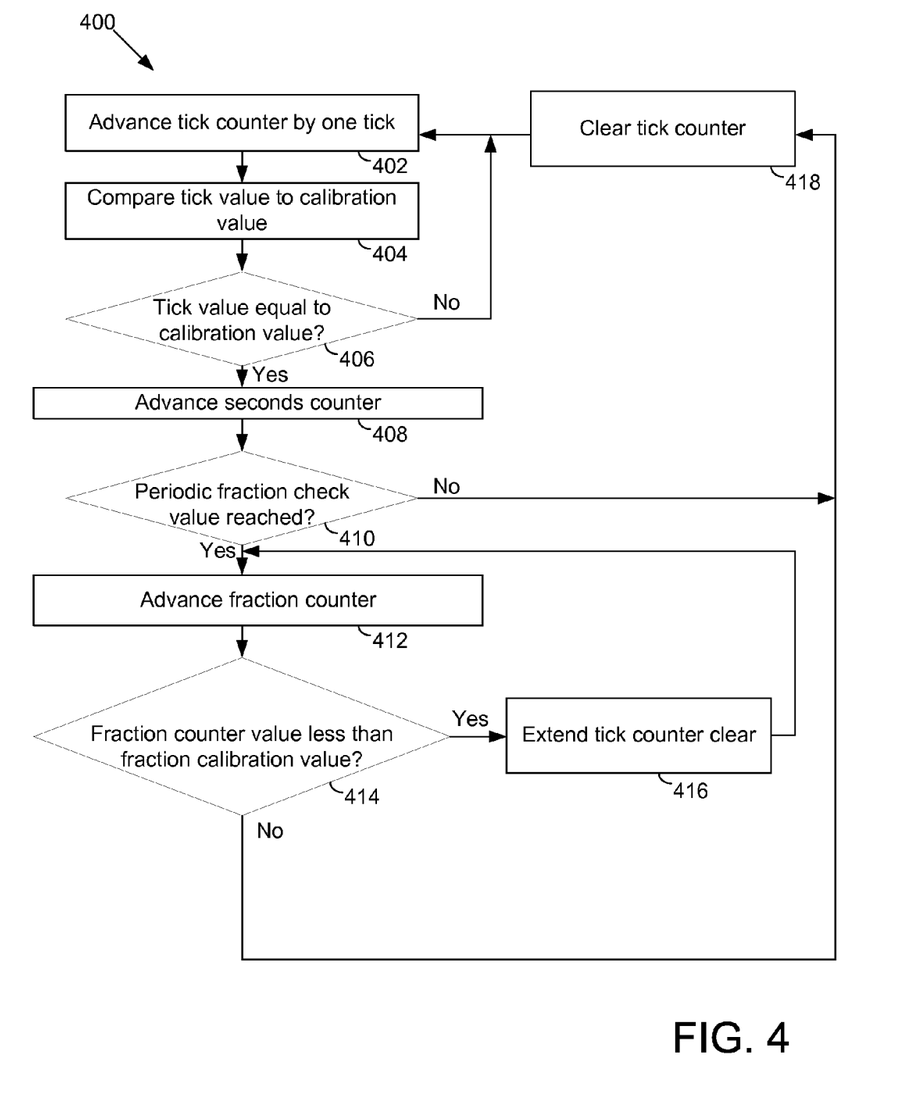
FIG. 4 is a flow diagram of method operations for maintaining a real-time tick count, according to an example.

FIG. 4 is a flow diagram of method operations for maintaining a real-time tick count, according to an example. Although described in conjunction with the system of FIGS. 1-3, those of skill in the art will recognize that any entity that performs the operations illustrated, in any feasible order, would be within the scope of the present disclosure.

As shown, a method 400 begins at operation 402, in which tick counter 220, upon being clocked by oscillator 120, advances a tick count. At operation 404, tick comparator 222 compares the tick count to a calibration value stored in calibration value register 226. At operation 406, if the tick value is not equal to the calibration value, then the method returns to operation 402. If the tick value is equal to the calibration value, then the method proceeds to operation 408.

At operation 408, tick comparator 222 advances the seconds counter 224. At operation 410, fraction counter control 225 determines whether the periodic fraction check value has been reach. In other words, fraction counter control 225 determines whether it has been 16 seconds since the last time the fractional functionality was invoked. If the periodic fraction check value has not been reached, then the method proceeds to operation 418. If the period fraction check value has been reached, then the method proceeds to operation 412, where fraction counter control 225 advances fraction counter 232. At operation 414, fraction counter control 225 determines whether the fraction counter 232 stores a value less than the fraction calibration value stored in fractional calibration register 228. If the value is less than the fraction calibration value, then the method proceeds to operation 416, where fraction comparator 230 extends the tick counter clear, after which the method 400 returns to operation 412. If the value is not less than the fraction calibration value, then the method proceeds to operation 418, where fraction counter control 225 clears the tick counter 220 and fraction counter 232, and after which the method returns to operation 402.

Figure 5:
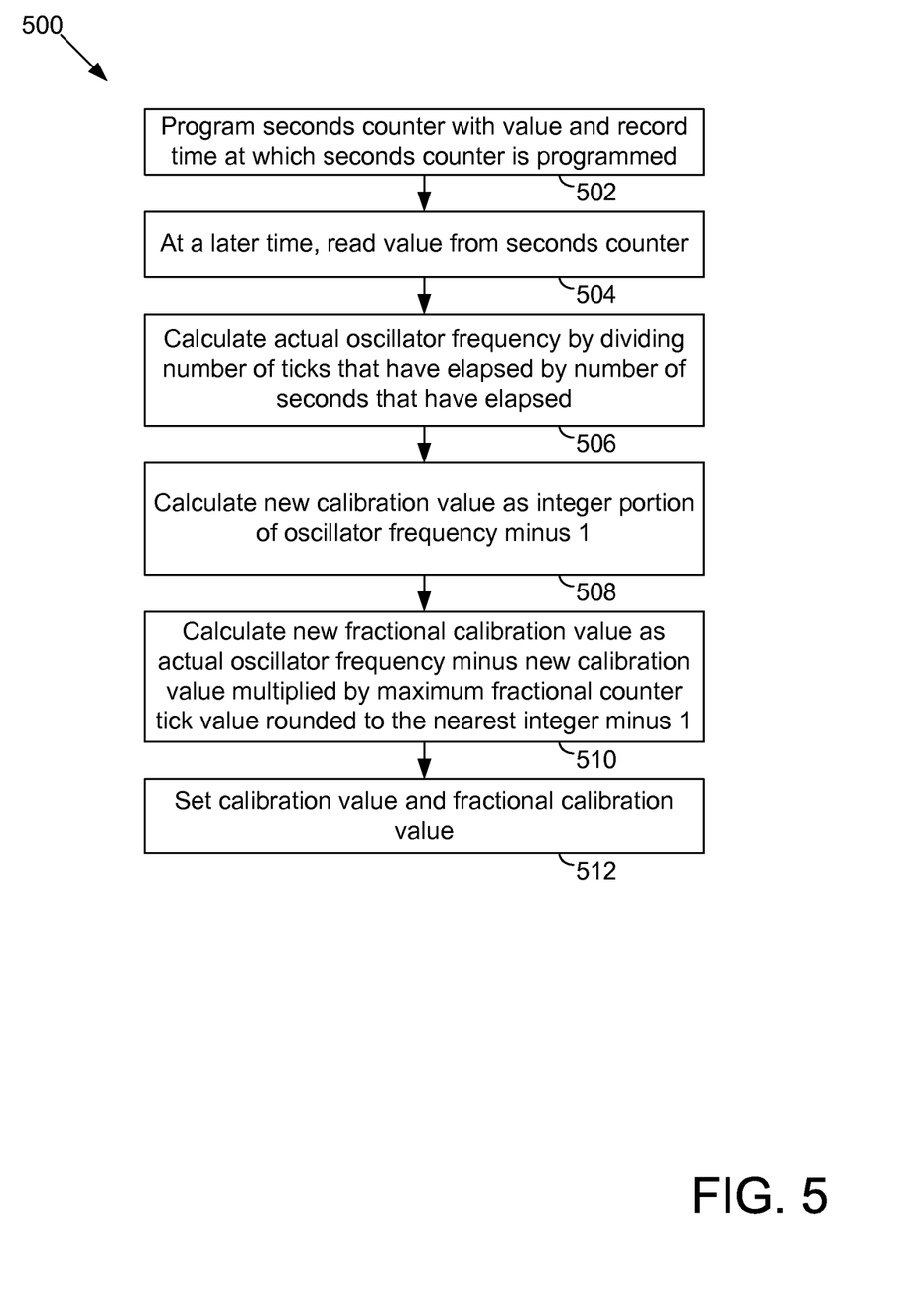
FIG. 5 is a flow diagram of method operations for calibrating the RTC core of FIG. 2, according to an example.

FIG. 5 is a flow diagram of method operations for calibrating the RTC core 104 of FIG. 2, according to an example. Although described in conjunction with the system of FIGS. 1-3, those of skill in the art will recognize that any entity that performs the operations illustrated, in any feasible order, would be within the scope of the present disclosure.

As shown, a method 500 begins at operation 502, in which RTC interface module 142 programs seconds counter with a value and records the time at which the seconds counter is programmed. At operation 504, at a later time, RTC interface module 142 reads a value from the seconds counter. At operation 506, RTC interface module 142 calculates an actual oscillator frequency by dividing the number of ticks that elapsed between programming and reading the seconds counter 224 by the number of seconds that have elapsed. At operation 508, RTC interface module 142 calculates a new calibration value as the integer portion of the oscillator frequency minus 1. At operation 510, RTC interface module 142 calculates a new fractional calibration value as the actual oscillator frequency minus the new calibration value multiplied by the maximum fractional counter tick value rounded to the nearest integer minus 1. At operation 512, RTC interface module 142 sets the calibration value and fractional calibration value.

Although signals are sometimes described herein as having a particular logical value—i.e., high or low (or "0" or "1" or some equivalent), those of skill in the art will recognize that for any particular signal, polarities may be reversed. For example, a signal that, when brought high, has a particular effect, may alternatively have that particular effect when brought low.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. A real-time clock system, comprising:
   a real-time clock core module operable in a first power supply domain, the real-time clock core module including a tick counter operable to advance a seconds counter based on an oscillator input; and
   a real-time clock controller operable in a second power supply domain and operable to provide an interface for reading a seconds count from the seconds counter,
   wherein the first power supply domain is powered by a battery when an electronic device that includes the real-time clock system is powered off and by a real-time clock core power supply when the electronic device is powered on, and
   wherein the second power supply domain is unpowered when the electronic device is powered off and is powered by a real-time clock controller power supply when the electronic device is powered on.

2. The real-time clock system of claim 1, further comprising:
   an oscillator operating in the first power supply domain and operable to clock the tick counter with a first frequency.

3. The real-time clock system of claim 1, further comprising:
   a power supply multiplexor operable to select one of the battery power supply or the real-time core power supply for powering the first power supply domain, depending on whether the real-time core power supply voltage is above a powered-on threshold.

4. The real-time clock system of claim 3, further comprising:
   a power gate; and
   a power gate control register,
   wherein the power gate control register is operable to control whether the power supply multiplexor provides power to the real-time clock core module.

5. The real-time clock system of claim 1, wherein the real-time clock core module further comprises:
   a calibration value register operable to store a calibration value; and
   a tick comparator operable to:
     compare the calibration value to a tick value stored in the tick counter,
     advance the seconds counter in response to determining that the calibration value is equal to the tick value, and
     clear the tick value in response to determining that the calibration value is equal to the tick value.

6. The real-time clock system of claim 5, wherein the real-time clock core module further comprises:
   a fractional calibration value register operable to store a fractional calibration value;
   a fraction counter coupled to the tick comparator and operable to store a fraction counter value; and
   a fraction comparator,
   wherein the tick comparator is further operable to advance the fraction counter in response to determining that the calibration value is equal to the tick value, and
   wherein the fraction comparator is operable to compare the fraction counter value to a periodic fraction check value and to delay clearing the tick counter by a number of ticks equal to the fraction fractional calibration value in response to determining that the fraction counter value is equal to the periodic fraction check value.

7. The real-time clock system of claim 1, wherein the tick counter includes a ripple carry counter.

8. The real-time clock system of claim 1, wherein the real-time clock controller comprises:
   an alarm register operable to store an alarm value;
   an interrupt status register; and
   an alarm comparator operable to compare the alarm value to a seconds value stored in the seconds counter and to update an alarm interrupt flag of the interrupt status register in response to determining that the alarm value is equal to the seconds value.

9. The real-time clock system of claim 1, further comprising:
   a pull-down resistor operable to clamp inputs of the real-time clock core module.

10. A method for maintaining a real-time clock value, the method comprising:
    operating a real-time clock core module in a first power domain, the real-time clock core module including a tick counter operable to advance a seconds counter based on an oscillator input;
    operating a real-time clock controller in a second power supply domain, the real-time clock controller operable to provide an interface for reading a seconds count from the seconds counter,
    wherein the first power supply domain is powered by a battery when an electronic device that includes the real-time clock system is powered off and by a real-time clock core power supply when the electronic device is powered on, and
    wherein the second power supply domain is unpowered when the electronic device is powered off and is powered by a real-time clock controller power supply when the electronic device is powered on.

11. The method of claim 10, further comprising:
    clocking the tick counter with a first frequency.

12. The method of claim 10, further comprising:
    selecting one of the battery power supply or the real-time core power supply for powering the first power supply domain, depending on whether the real-time core power supply voltage is above a powered-on threshold.

13. The method of claim 12, further comprising:
    controlling whether the power supply multiplexor provides power to the real-time clock core module based on a power gate control register value.

14. The method of claim 10, further comprising:
    comparing a calibration value stored in a calibration value register to a tick value stored in the tick counter,
    advancing the seconds counter in response to determining that the calibration value is equal to the tick value, and
    clearing the tick value in response to determining that the calibration value is equal to the tick value.

15. The method of claim 14, further comprising:
    storing a fractional calibration value in a fractional calibration value register;
    storing a fraction counter value in a fraction counter coupled to the tick comparator;
    comparing the calibration value to the tick value and advancing the fraction counter in response to determining that the calibration value is equal to the tick value; and
    comparing the fraction counter value to a periodic fraction check value and delaying clearing the tick counter by a number of ticks equal to the fraction fractional calibration value in response to determining that the fraction counter value is equal to the periodic fraction check value.

16. The method of claim 10, wherein:
the tick counter is operable to store and advance a tick value via a ripple carry counter.

17. The method of claim 10, further comprising:
storing an alarm value in an alarm register; and
comparing the alarm value to a seconds value stored in the seconds counter and updating an alarm interrupt flag in response to determining that the alarm value is equal to the seconds value.

18. The method of claim 10, further comprising:
clamping, via a pull-down resistor, inputs of the real-time clock core module.

19. An electronic device, comprising:
a real-time clock interface module; and
a real-time clock system comprising:
    a real-time clock core module operable in a first power supply domain, the real-time clock core module including a tick counter operable to advance a seconds counter based on an oscillator input; and
    a real-time clock controller operable in a second power supply domain and operable to provide an interface for reading a seconds count from the seconds counter,
    wherein the first power supply domain is powered by a battery when an electronic device that includes the real-time clock system is powered off and by a real-time clock core power supply when the electronic device is powered on, and
    wherein the second power supply domain is unpowered when the electronic device is powered off and is powered by a real-time clock controller power supply when the electronic device is powered on.

20. The electronic device of claim 19, wherein the real-time clock system further comprises:
a power supply multiplexor operable to select one of the battery power supply or the real-time core power supply for powering the first power supply domain, depending on whether the real-time core power supply voltage is above a powered-on threshold.

* * * * *